United States Patent [19]

Lauer et al.

[11] 4,434,559
[45] Mar. 6, 1984

[54] TOOL FOR GAUGING THE CORNERS OF WORKPIECES OF SHEET METAL OR THE LIKE

[76] Inventors: Gerhard Lauer, Grosswaldstrasse 6, D-6686 Eppelborn; Alfred Morawiez, Oderring 13, D-6610 Lebach; Jürgen Wild, Am Stehlsberg 4, D-6601 Riegelsberg, all of Fed. Rep. of Germany

[21] Appl. No.: 321,794

[22] Filed: Nov. 16, 1981

[30] Foreign Application Priority Data

Nov. 18, 1980 [DE] Fed. Rep. of Germany ....... 3043430

[51] Int. Cl.$^3$ .............................................. G01B 3/56
[52] U.S. Cl. ................................. 33/174 L; 33/169 D
[58] Field of Search ............ 33/169 D, 169 C, 172 D, 33/172 E, 174 Q, 174 L

[56] References Cited

U.S. PATENT DOCUMENTS

| | | | |
|---|---|---|---|
| 2,807,882 | 10/1957 | Lovenston | 33/174 L X |
| 3,012,330 | 12/1961 | Mendham | 33/174 L |
| 3,520,063 | 7/1970 | Rethwish et al. | 33/174 L |
| 4,237,613 | 12/1980 | Slough et al. | 33/174 Q |
| 4,305,207 | 12/1981 | Lantz | 33/174 Q |

*Primary Examiner*—William D. Martin, Jr.
*Attorney, Agent, or Firm*—Kontler, Grimes & Battersby

[57] ABSTRACT

A tool for ascertaining the location of an elongated corner or edge between two mutually inclined surfaces of a workpiece has a frame which supports two cylinders for reciprocable piston rods whose front end portions abut against a work contacting device having faces, rollers, balls or analogous portions each movable into contact with a different surface of the workpiece when the tool is properly positioned with reference to such surfaces. If the location of the corner deviates from the desired location, one of the aforementioned portions engages the respective surface of the workpiece prior to engagement between the other portion and the corresponding surface of the workpiece whereby the one portion of the work contacting device moves transversely of the path of movement of the corresponding piston rod while the other piston rod continues to move toward the workpiece. The extent of movement of each piston rod is monitored by electronic or other suitable means. The work contacting device can be connected to the frame by a spring so that it is urged against the piston rods, and the work contacting device can pivot about an axis located on the line which bisects the angle between the two surfaces of the workpiece. The work contacting device is movable in a plane which is normal to the longitudinal direction of the corner.

23 Claims, 7 Drawing Figures

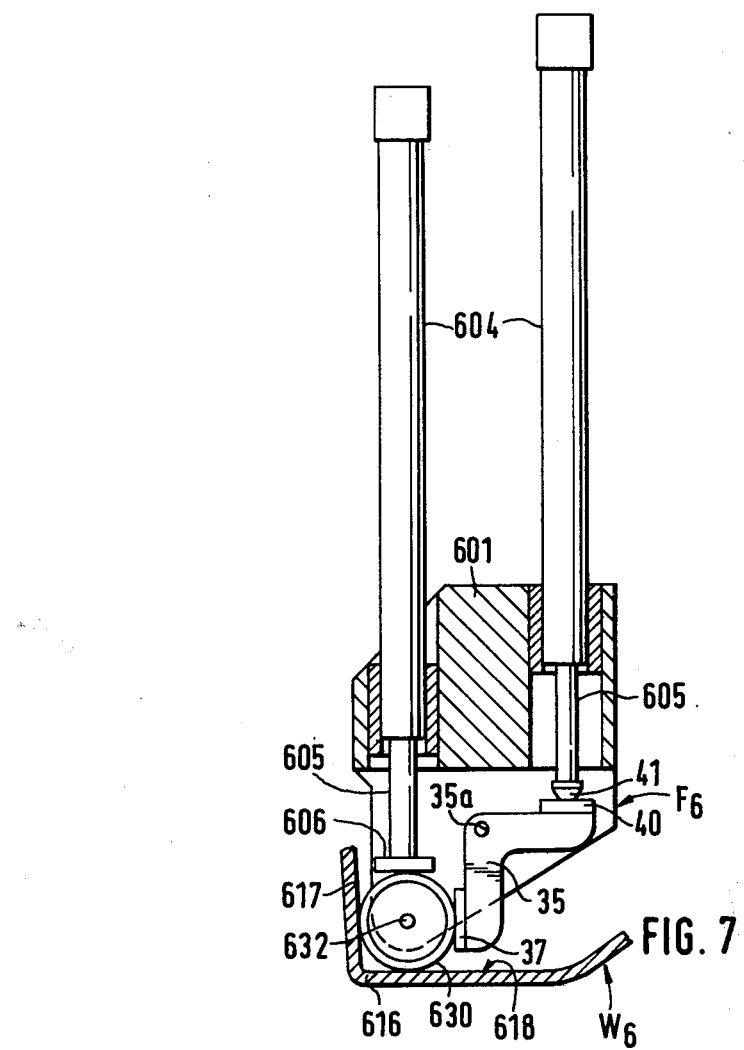

TOOL FOR GAUGING THE CORNERS OF WORKPIECES OF SHEET METAL OR THE LIKE

BACKGROUND OF THE INVENTION

The present invention relates to measuring or gauging devices in general, and more particularly to improvements in tools for measuring or gauging the corners or edges of relatively large bodies, such as workpieces which consist of sheet metal or the like. Still more particularly, the invention relates to improvements in tools or gauges which can ascertain the locations of corners on a variety of bodies, such as workpieces which constitute component parts of automotive vehicles or the like.

It is already known to provide a corner gauging tool with two sensors which are mounted in a common frame and each of which is movable substantially at right angles with reference to a different one of the two surfaces bounding a corner on a metallic or plastic body (hereinafter referred to as workpiece). Such tools are often used to ascertain the locations of rounded corners or edges. The positions of the two sensors are monitored, for example by electronic detector means, to ascertain whether or not the position of the corner conforms to or deviates from the desired or standard position.

A drawback of presently known tools of the just outlined character is that the measurement furnishes misleading indications if the location of the corner deviates from the desired or anticipated location to such an extent that one of the sensors directly engages the rounded surface of the corner rather than one of the surfaces which flank or bound the corner. If the corner is an internal or inside corner, the tool will indicate that the plane of the one surface is nearer to the respective sensor than is actually the case. Inversely, if the corner is an external corner, the measurement will falsely indicate an excessive distance between the one surface and the corresponding sensor.

OBJECTS AND SUMMARY OF THE INVENTION

An object of the invention is to provide a simple and compact but highly versatile tool for gauging the positions of corners in metallic, plastic or other types of workpieces with a heretofore unknown degree of accuracy.

Another object of the invention is to provide a tool which can ascertain the positions of inside or outside corners, which can be used for gauging the positions of corners which are not readily accessible, and which is much less likely to furnish misleading readings than heretofore known tools.

A further object of the invention is to provide the above outlined tool with novel and improved work contacting means and with novel and improved means for mounting such work contacting means.

An additional object of the invention is to provide the tool with novel and improved means for maintaining the work contacting means in engagement with the parts which transmit motion thereto.

Still another object of the invention is to provide the tool with novel and improved means for permitting access to hard-to-reach surfaces bounding corners or edges of workpieces to be gauged and to provide the tool with novel and improved means for supporting the sensors which are movable toward such surfaces.

A further object of the invention is to provide a tool which comprises a small number of relatively simple parts and which can be readily manipulated by semi-skilled or unskilled persons, for example, in the assembly lines for automotive vehicles or the like.

The invention is embodied in a tool which serves to ascertain the location of a corner or edge between mutually inclined first and second surfaces of workpiece, especially a rounded corner of a workpiece which is made of sheet metal. The tool comprises first and second sensors (such sensors may constitute reciprocable piston rods of fluid-operated cylinder-and-piston units), means for supporting the sensors in such orientation that each thereof is movable toward the respective surface of the workpiece to be gauged (the supporting means can comprise a frame which can support several sets of sensors and a yoke which reciprocably mounts the sensors), means (such as the cylinders of the aforementioned fluid-operated cylinder-and-piston units) for moving the sensors with reference to the supporting means toward the respective surfaces along predetermined first and second paths; and work contacting means interposed between the sensors and the surfaces of the workpiece. The work contacting means comprises a first portion (e.g., a first spherical element mounted in a cage which is movably secured to the supporting means) and a second portion (e.g., a second spherical element which is mounted in the aforementioned cage), and the two portions of the work contacting means are movable by the respective sensors toward the corresponding surfaces of the workpiece. At least one portion (e.g., the first portion) of the work contacting means is further movable transversely of the path of the first sensor when the first portion of the work contacting means already engages the corresponding (first) surface of the workpiece while the second portion of the work contacting means continues to advance toward the respective (second) surface of the workpiece.

The means for moving the first portion transversely of the first path in response to movement of the second sensor after the first sensor is already arrested by the workpiece may constitute the means for moving the second sensor, i.e., the second portion of the work contacting means moves the first portion transversely of the first path when the first portion already engages the corresponding (first) surface but the second portion is still out of contact with the other (second) surface of the workpiece. The extent of movement of each sensor is monitored by electronic means or in another suitable way. If the position or location of the corner is proper, the two portions of the work contacting means will simultaneously engage the respective surfaces of the workpiece.

In accordance with a presently preferred embodiment of the invention, each portion of the work contacting means is movable transversely of the respective path, and the sensors are preferably reciprocable at right angles to the planes of the respective surfaces of the workpiece. The aforediscussed portions of the work contacting means can constitute the aforementioned spherical elements or they may constitute integral parts of a one-piece work contacting device. Furthermore, at least one portion of the work contacting means may constitute a plate- or disc-shaped insert which can be caused to move into contact with a relatively narrow surface of a workpiece.

The novel features which are considered as characteristic of the invention are set forth in particular in the appended claims. The improved tool itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 7 is a fragmentary partly sectional plan view of a tool which constitutes a modification of the tool shown in FIG. 6 and is designed to ascertain the location of a recessed corner between two surfaces making an angle of less than 180°.

DESCRIPTION OF THE PREFERRED EMBODIMENTS

Figure 1:
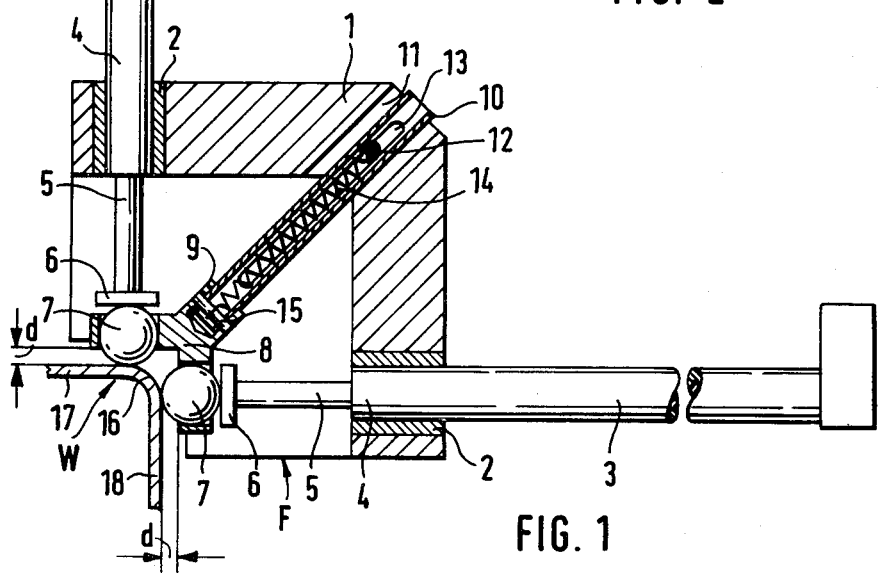
FIG. 1 is a somewhat schematic partly sectional plan view of a tool which embodies one form of the invention and is designed to ascertain the location of a rounded corner or edge between two surfaces which make an angle of 90°.

The corner gauging tool which is shown in FIG. 1 comprises supporting means for two sensors 5. The supporting means includes a measuring frame F and a substantially L-shaped bracket or yoke 1 which is rigidly connected with the frame F. The two legs of the yoke 1 are disposed at right angles to each other, and the axes 3 of the two sensors 5 also make an angle of 90 degrees. Each of these sensors constitutes the piston rod of a discrete moving means or motor means including a double-acting or single-acting fluid-operated (preferably pneumatic) cylinder and piston unit whose cylinder 4 is held in the respective leg of the yoke 1 by a clamping sleeve 2 and can reciprocate the respective sensor or piston rod 5 at right angles to the respective leg of the yoke. The front end portions of the sensors 5 carry plate-like platforms 6 of preferably circular shape which abut against spherical elements 7 mounted in a receptacle here shown as a cage 8. The cage 8 and the two spherical elements 7 (hereinafter called balls for short) together constitute a work contacting device which is movable with one of the sensors 5 and/or with the other of the sensors 5. Thus, if the right-hand (horizontal) sensor 5 of FIG. 1 is moved in a direction to the left, the cage 8 of the work contacting device shares such movement of this sensor because the platform 6 at the front end of the right-hand sensor 5 pushes the respective ball 7 which is mounted in and thus entrains the cage 8. If the other or left-hand (vertical) sensor 5 of FIG. 1 is at a standstill while the horizontal sensor 5 moves in a direction to the left, the left-hand ball 7 rolls along the adjacent platform 6 at the lower end of the vertical sensor 5. The situation is analogous when the vertical sensor 5 of FIG. 1 is moved downwardly; if the horizontal sensor 5 is idle, the right-hand ball 7 rolls along the respective (right-hand) platform 6. The movements of the sensors 5 with reference to the corresponding cylinders 4 are monitored by electronic detector means of known design (not shown in FIG. 1).

The workpiece W is formed with a corner or edge 16 having a rounded outer face and flanked by two flat surfaces 17, 18 which make an angle of 90 degrees. The axis 3 of the horizontal sensor 5 is normal to the surface 18, and the axis 3 of the vertical sensor 5 is normal to the surface 17 of the workpiece W when the workpiece is held in the illustrated position and orientation with reference to the frame F or vice versa. In such position of the workpiece W, the plane of the surface 17 is parallel to the plane of the underside of the platform 6 at the lower end of the vertical sensor 5, and the plane of the left-hand side of the platform 6 at the left-hand end of the horizontal sensor 5 is parallel to the plane of the surface 18. Thus, the just discussed surfaces of the two platforms 6 extend at right angles to the axes 3 of the corresponding sensors 5.

The cage 8 has a sleeve-like rearward extension 9 for the corresponding end portion of an elongated hollow rod or lever 10 which is secured to the extension 9 by a coupling pin 15. The rear portion of the rod or lever 10 extends with clearance through an opening or passage 11 which is machined into the yoke 1 at the junction of its horizontal and vertical legs (as viewed in FIG. 1). The height of the passage 11, as viewed at right angles to the plane of FIG. 1, need not appreciably exceed the diameter of the rod 10, i.e., the latter cannot be moved toward or away from the observer of FIG. 1. However, the width of the passage 11, as considered in the plane of FIG. 1, exceeds the corresponding dimension of the rod 10 so that the latter can pivot, within limits, about the axis of a pin-shaped fulcrum 12 mounted in the yoke 1 so as to extend at right angles to the plane of FIG. 1. The rod 10 has two aligned elongated slots 13 for the fulcrum 12 so that the cage 8 is movable in the axial direction of the rod 10 to an extent which is determined by the length of the slots 13.

The axial bore of the rod 10 contains a helical spring 14 one end portion of which is attached to the fulcrum 12 and the other end portion of which is attached to the aforementioned coupling pin 15 connecting the extension 9 to the respective end portion of the rod 10. The spring 14 constitutes a means for biasing the balls 7 against the respective platforms 6, i.e., for urging the cage 8 in a direction toward the passage 11 of the yoke 1.

When the outer chambers (not specifically shown) of the cylinders 4 receive a pressurized gaseous fluid, the sensors 5 move axially toward the respective surfaces 17, 18 of the workpiece W whereby the spring 14 stores energy because the rod 10 slides with reference to the fulcrum 12 since the cage 8 is compelled to share the movements of the balls 7. The forward progress of the platforms 6 is terminated when the balls 7 strike against the adjacent surfaces 17, 18 of the workpiece W. As mentioned above, when the workpiece W is properly oriented relative to the frame F and/or vice versa, the axes 3 of the sensors 5 are normal to the respective surfaces 17, 18 of the workpiece W and the front surfaces of the platforms 6 (namely, those surfaces which contact the adjacent balls 7) are parallel with the respective surfaces 17, 18.

If the corner 16 of the workpiece W is located in an optimum or desired position, namely, if it is halved by the bisecting or median line of the angle between the surfaces 17 and 18 and such bisecting line coincides with the line bisecting the angle between the axes 3 of the two sensors 5, the right-hand ball 7 contacts the surface 18 at the very moment when the surface 17 is contacted by the left-hand ball 7.

If the corner 16 is located to the left of (i.e., above) the just discussed bisecting line (in FIG. 1, this bisecting line is the axis of the rod 10), the left-hand ball 7 engages the surface 17 prior to movement of the right-hand ball 7 into actual contact with the surface 18 of the workpiece W. During the interval of movement of the horizontal sensor 5 subsequent to stoppage of the vertical sensor 5 by the surface 17, the upper or left-hand ball 7 cannot move downwardly, as viewed in FIG. 1, but, instead, moves in a direction to the left by rolling or sliding between the adjacent surface or underside of the respective platform 6 on the one hand and the surface 17 on the other hand, i.e., the upper ball 7 moves in parallelism with the axis 3 of the horizontal sensor 5 and comes to a halt when the right-hand ball 7 reaches the surface 18. In other words, any movement of one sensor 5 while the other sensor 5 is already arrested entails a movement of the ball 7 which is associated with the other sensor in parallelism with the axis 3 of the one sensor, i.e., at right angles to the axis 3 of the other sensor.

If the corner 16 is located to the right of (i.e., below) the aforediscussed bisecting line (the axis of the rod 10, as viewed in FIG. 1), the right-hand ball 7 is arrested ahead of the left-hand ball 7 and the vertical sensor 5 continues to move downwardly toward the surface 17 when the horizontal sensor 5 is already arrested by the surface 18 of the workpiece W. The right-hand ball 7 then moves in a direction at right angles to the axis 3 of the horizontal sensor 5 by sliding or rolling along the surface 18 and along the adjacent left-hand side or surface of the associated platform 6. It will be noted that the cylinder 4 for the sensor 5 which moves the right-hand ball 7 constitutes a means for moving the left-hand ball 7 at right angles to the common axis 3 of the corresponding cylinder 4 and sensor 5, or vice versa. The extent of movement of the one sensor 5 relative to the other sensor 5 is ascertained by the aforementioned electronic monitoring means and is converted into an indication of the extent of misalignment or lack of proper positioning of the corner 16 on the tested workpiece W.

When the horizontal sensor 5 has completed its leftward stroke because the right-hand ball 7 abuts against the surface 18, and the vertical sensor 5 has completed its downward stroke because the left-hand ball 7 abuts against the surface 17 of the workpiece W, one of the balls 7 maintains the other ball 7 in such position that the distance between the locus of point contact of the surface 17 with the corresponding ball 7 and the central portion of the corner 16 is the same as the distance between such central portion and the locus of contact of the surface 18 with the corresponding ball 7. This is due to the configuration and mounting of the cage 8 for the two balls 7. The angular position of the cage 8 is fixed by the rod 10, and the distance between the cage 8 and the axis of the fulcrum 12 is substantial so that the balls 7 are not likely to change their positions once the sensors 5 come to a halt in their extended positions. It can be assumed that the mutual inclination of the surfaces 17, 18 is accurate even if the location of the corner 16 happens to deviate from the optimum location; therefore, the cage 8 always assumes a position or is close to a position in which it is halved by the plane bisecting the angle between the surfaces 17 and 18, i.e., the cage 8 has two halves at the opposite sides of the imaginary line of intersection between the extensions of the surfaces 17, 18 in front of the corner 16.

The reference characters d denote the extent to which the balls 7 project beyond the respective arms of the yoke 8 in directions toward the respective surfaces 17, 18 of the workpiece W.

The left-hand ball 7 of FIG. 7 can be said to constitute that rotary portion or element of the work contacting device which is movable (by the vertical sensor 5) toward and into contact with the surface 17, and the right-hand ball 7 constitutes that rotary portion or element of the work contacting device which is movable toward and into engagement with the surface 18. If the workpiece W is likely to be configurated in such a way that the corner 16 assumes the desired position or is located at a particular side of the aforediscussed bisecting line, the work contacting device 7, 8, 7 can be made rigid with one of the sensors 5. For example, if the corner 16 is likely to be located above the bisecting line but not below the bisecting line, as viewed in FIG. 1, the left-hand ball 7 should be free to move relative to the adjacent horizontal platform 6 but the right-hand ball 7 can be made an integral part of the horizontal sensor 5. In other words, it suffices (under certain circumstances) if the work contacting device is movable transversely of the path of only one of the sensors but need not necessarily move transversely of the path of the other sensor.

It is further clear that the means (cylinder 4) for moving the left-hand ball 7 of FIG. 1 transversely of the path of movement of the vertical sensor 5 need not necessarily constitute the means for moving the right-hand ball 7 and the corresponding horizontal sensor 5 at right angles to the surface 18, or vice versa. However, the illustrated construction is preferred at this time because it contributes to simplicity and accuracy of the measuring tool.

The frame F can support an entire battery of yokes 1, one for each of several pairs of sensors 5 and for the means which move the respective sensors. This frame can be disposed adjacent to a door opening during assembly of an automotive vehicle in order to ascertain the positions of various edges of the structure bounding the door opening. Such measurement or gauging ensures that all of the corners are in proper positions for satisfactory engagement with complementary portions of (e.g., sealing strips on) the door.

An important advantage of the improved tool is that the measuring or gauging operation is not dependent on the desired or required position but rather on the actual position of the corner or edge 16. The point of measurement is always located at the actual or imaginary intersection of the surfaces 17, 18 which bound the corner 16. Otherwise stated, the distance from the locus of point contact between the left-hand ball 7 and the surface 17 to the imaginary intersection of the extensions of surfaces 17, 18 in front of the corner 16 is the same as the distance from such intersection to the point of contact between the right-hand ball 7 and the surface 18. Thus, the improved tool can ascertain the position of an imaginary point of line (such as the aforementioned intersection between the extensions of the surface 17, 18 in front of the corner 16) or the position of a point on or a portion of the convex surface bounding the outer side of the corner 16.

The cage 8 constitutes an optional but desirable receptacle for the balls 7 of the work contacting device. This device is movable in a plane which is parallel to that of FIG. 1 in directions which are parallel to the two axes 3, i.e., in directions which are parallel to the paths of movement of the two sensors 5. The just mentioned plane is normal to the pivot axis of the rod 10 and to the longitudinal extension of the corner 16 (this corner is assumed to extend at right angles to the plane of FIG. 1).

Since the horizontal cylinder 4 for the corresponding sensor 5 constitutes the means for moving the left-hand ball 7 of the work contacting device relative to the left-hand platform 6 and surface 17, and the vertical cylinder 4 for the corresponding sensor 5 constitutes the means for moving the right-hand ball 7 relative to the surface 18 and the right-hand platform 6 (when the work contacting device 7, 8, 7 is to be moved transversely of the path of movement of the horizontal or vertical sensor), the improved tool is surprisingly simple and compact because the means for moving the sensors 5 relative to the supporting means F, 1 also constitute the means for moving the work contacting device 7, 8, 7 with reference to the horizontal or vertical sensor, depending upon whether the left-hand ball 7 engages the surface 17 prior to movement of the right-hand ball 7 into engagement with the surface 18 or vice versa. The just discussed simplification and resulting compactness of the improved tool enhances its accuracy because the number of parts is reduced to a minimum in spite of the fact that the sensors 3 are movable with reference to the supporting means F, 1 and that the work contacting device 7, 8, 7 is movable with reference to each of the platforms 6, i.e., with reference to each of the two sensors 5.

It is also within the purview of the invention to connect the two sensors 5 to each other so that they together constitute a unitary structure which is movable horizontally and/or vertically, as viewed in FIG. 1. In such embodiment of the invention, the foremost portions of the two interconnected sensors (namely, those portions which come into contact with the surfaces 17 and 18) constitute the aforediscussed first and second portions of the work contacting device, and such work contacting device is movable (with the two sensors) transversely of the normal or anticipated path of movement of at least one of the sensors when the device already contacts one surface but is still out of contact with the other surface of the workpiece. In the just discussed embodiment of the invention, the sensors 5 are movable in the directions indicated by the respective axes 3 as well as at right angles to such axes, always in a plane which is parallel to or includes the plane of FIG. 1. The electronic or other suitable monitoring means then comprises a system which can ascertain the extent of positive or negative movement of the sensors insofar as such movement has a component in the axial direction of the respective sensor. An advantage of the structure which is shown in FIG. 1 and wherein the work contacting device 7, 8, 7 is not integral with the two sensors 5 is that the extent of movement of this device transversely of the horizontal or vertical sensor need not be recorded because such movement can be determined and recorded as a movement of the corresponding sensor, i.e., the movement of the vertical sensor 5 while the horizontal sensor 5 is already arrested or vice versa. The platforms 6 constitute means for guiding the respective balls 7 during movement of the work contacting device 7, 8, 7 transversely of the axis of the vertical sensor 5 or transversely of the axis of the horizontal sensor 5. These platforms ensure that the work contacting device is invariably guided for movement transversely of the axis of the horizontal or vertical sensor 5 and they do not adversely influence the facility with which the straight-line movements of the sensors 5 with reference to the cylinders 4 can be monitored by the aforementioned electronic or other suitable system.

It goes without saying that the balls 7 can be replaced by cylindrical or barrel-shaped rollers without departing from the spirit of the invention. Such portions or elements of the work contacting device render it possible to move the work contacting device transversely of the path of movement of the vertical or horizontal sensor 5 with a minimum of effort. Spherical elements are especially advantageous because they are in mere point contact with the platforms 6 and with the respective surfaces 17, 18. At the same time, such spherical elements are less likely to score the surfaces 17, 18 than would pointed portions of the work contacting device. Furthermore, the spherical elements 7 can be readily installed in the receptacle or cage 8 in such a way that the extent (see the distance d in FIG. 1) to which they project beyond the front side of the cage 8 is the same in each and every angular position or orientation of such spherical elements. This is of particular importance and advantage in view of pivotal mounting of the rod 10 on the yoke 1, i.e., in view of the fact that the position of the cage 8 with reference to the aforementioned bisecting line can change when one of the balls 7 engages the respective surface 17 or 18 prior to engagement of the other ball 7 with the corresponding surface 18 or 17. It is not even necessary to rotatably mount the balls 7 in the yoke 8, i.e., the balls can be fixedly mounted in the cage in such positions that the extent to which one of the balls projects forwardly beyond the cage is the same as the extent to which the other ball projects from the cage and toward the workpiece. In such instances, the balls 7 can be replaced by hemispherical or even smaller portions of complete spheres. In fact, it is often sufficient to provide the cage 8 with two small integral protuberances or lobes which constitute equivalents of the forwardly extending portions of the balls 7, i.e., of ball portions extending beyond those surfaces of the cage 8 which face the surfaces 17 and 18 of the workpiece W.

In accordance with a further modification of the tool which is shown in FIG. 1, the work contacting device 7, 8, 7 can be replaced with a device whose angular position is determined exclusively by the workpiece W. The yoke 8 is then replaced with a part which is yieldably biased against the rounded external surface of the corner 16 and which has two protuberances replacing the rearwardly extending portions of the balls 7 and contacting the respective platforms 6. The protuberances can constitute portions of balls, cones or analogous bodies which are slidable along the adjacent surfaces of the respective platforms 6. Such embodiment of the improved tool can be used with particular advantage when the mutual inclination of the surfaces 17, 18 is the same from workpiece to workpiece.

The rod 10, its slots 13, the fulcrum 12 and the passage 11 constitute a very simple but effective means for limiting or confining the work contacting device 7, 8, 7 to movements in the plane of FIG. 1, i.e., in a plane which is normal to the longitudinal direction of the corner 16. The placing of the axis of the fulcrum 12 on or at least close to the aforementioned bisecting line and at a relatively great distance from the corner 16 ensures that one of the balls 7 can readily move along the corresponding platform 6 when the other ball 7 already contacts the respective surface 17 or 18. The spring 14 ensures that the balls 7 remain in contact with the respective platforms 6. Since the distance between the axis of the fulcrum 12 and the cage 8 is rather pronounced, the angular displacement of the cage and balls 7 about such axis is relatively small when one of the balls slides or rolls along the adjacent surface 17 or 18 of the workpiece W. This is acceptable under certain circumstances, namely, when the angular positions of the surfaces 17, 18 with reference to each other are not likely to change from workpiece to workpiece and the positions of such surfaces with reference to any other portion or portions of the workpiece are equally unlikely to change from workpiece to workpiece, i.e., when only the position or location of the corner 16 is likely to vary at times and, therefore, the location of the corner must be ascertained prior to completing the assembly of the tested workpiece with other workpieces. The above explanations will be more readily appreciated by assuming that the workpiece W is a casting, a drop forged article or a molded article which is one of a long series of articles manufactured under similar or identical circumstances. In such series, at least the major portions of successive articles are sufficiently close to the prescribed norm that their dimensions and/or configuration need not be checked prior to assembly with other parts of a vehicle or the like.

Figure 2:
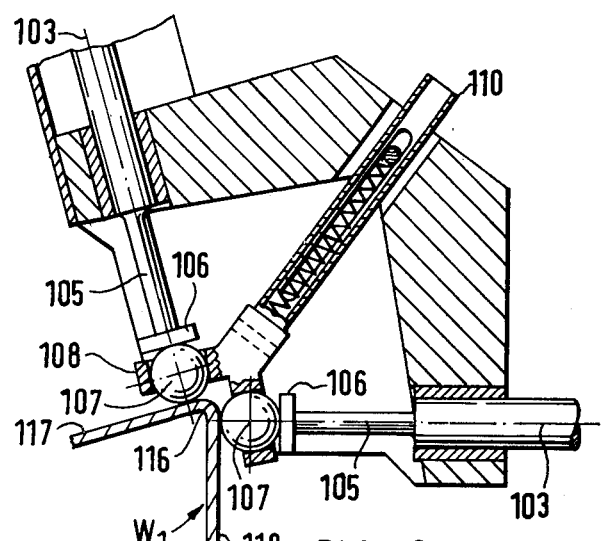
FIG. 2 is a fragmentary partly sectional plan view of a modified tool which can ascertain the location of a corner between two surfaces making an acute angle.

FIG. 2 illustrates a portion of a modified gauging tool wherein all such parts which are identical with or clearly analogous to corresponding parts of the tool of FIG. 1 are designated by similar reference characters plus 100. The workpiece W1 defines a rounded corner 116 between two flat external surfaces 117, 118 which make an acute angle.

The axes 103 of the two sensors 105 are normal to the planes of the respective surfaces 117, 118, i.e., such axes make an obtuse angle which, with the angle between the surfaces 117, 118, adds up to 180 degrees. The two arms of the cage 108 make an angle of 90°.

Figure 3:
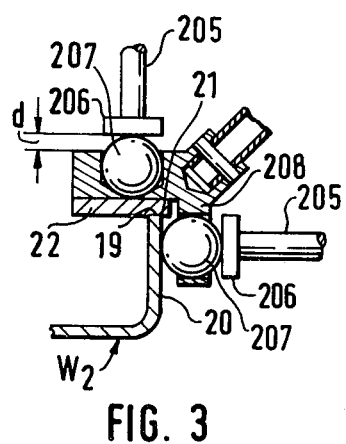
FIG. 3 is a fragmentary plan view of a third tool which is designed to ascertain the location of the corner between a relatively wide surface and a narrow surface of a workpiece.

FIG. 3 shows a portion of a third tool which is designed to gauge a workpiece W2 wherein the corner or edge 21 is located between two surfaces 19, 20 making an angle of 90°. The surface 19 is very narrow so that it could not be directly contacted by the respective ball 207 (namely, by the ball at the lower end of the vertical sensor 205, as viewed in FIG. 3). In many instances, the very narrow surface 19 is rounded which further reduces the likelihood or possibility of contacting such surface by one of the balls 207. Therefore, the work contacting device of the tool of FIG. 3 further comprises a plate-like insert 22 which can have a circular or other shape and is adjacent to the outer side of the respective arm of the cage 208. The thickness of the insert 22 equals the extent to which the ball 207 contacting the platform 206 at the left-hand end of the horizontal sensor 205 extends beyond the respective arm of the cage 208. The lower portion of the left-hand ball 207 is completely embedded in the respective arm of the cage 208. The exposed surface of the insert 22 is placed against the surface 19 of the workpiece W2 when the tool of FIG. 3 is put to use. The manner in which the cage 208 is connected to the yoke (not shown in FIG. 3) is the same as shown in FIG. 1 or 2. Furthermore, the mode of operation of the tool of FIG. 3 is clearly analogous to that of the tool shown in FIG. 1 or 2; the only difference is that the left-hand ball 207 does not directly contact the narrow surface 19 of the workpiece W2 which is contacted, instead, by the exposed side or surface by the insert 22. The vertical sensor 205 shifts the right-hand ball 207 along the surface 20 if such vertical sensor is permitted to continue its downward movement (in order to engage the insert 22 with the surface 19) after the horizontal sensor 205 is already arrested by the surface 20.

In FIG. 3, the reference character d denotes the extent to which the left-hand ball 207 projects beyond the horizontal arm of the yoke 208 and toward the adjacent platform 206. The thickness of the insert 22 can equal d.

Figure 4:
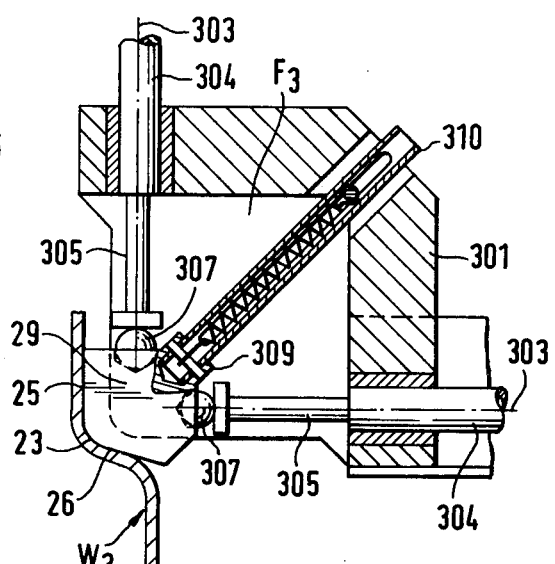
FIG. 4 is a fragmentary partly sectional plan view of a fourth tool which is designed to ascertain the location of an inside corner between two surfaces making an angle of 90°.

FIG. 4 illustrates the manner of gauging the concave side of a corner 23 between the flat external surfaces 25 and 26 of a workpiece W3. In this instance, the two balls 307 are seated in a block-shaped cage 29 whose exposed convex surface conforms (i.e., is complementary) to the surface at the outer side of the corner 23. The manner in which the sleeve-like extension 309 of the cage 29 is secured to the rod 310, and in which the rod 310 is mounted in the yoke 301 is the same as described in connection with FIG. 1. The axes 303 of the two sensors 305 make an angle of 90° because the surfaces 25 and 26 which flank the concave outer side or surface of the corner or edge 23 are disposed at right angles to each other. If the underside of the cage 29 is arrested by the surface 26 before the horizontal sensor 305 comes to a halt, the latter pushes the cage 29 in a direction to the left until the corresponding surface portion of the cage 29 strikes against and is arrested by the surface 25. In this embodiment of the improved tool, those portions of the work contacting device which move toward and into contact with and are at least substantially complementary to the surfaces 25, 26 of the workpiece W3 constitute integral parts of the cage 29, i.e., the balls 307 cannot reach the respective surfaces 25, 26.

Figure 5:
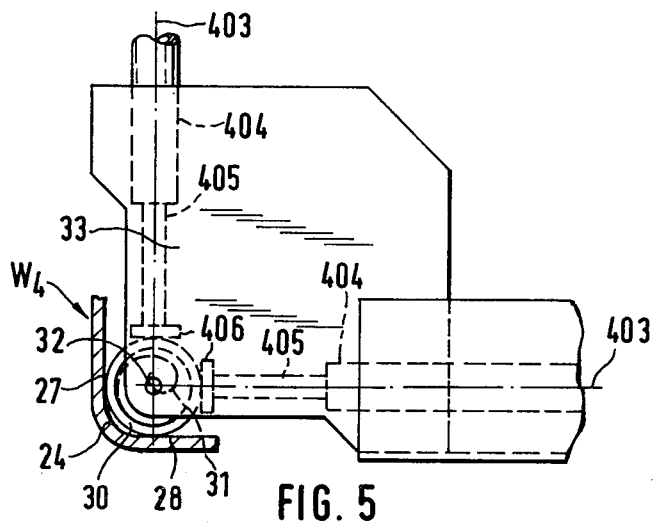
FIG. 5 is a fragmentary partly sectional plan view of a tool which constitutes a modification of and serves the same purpose as the tool of FIG. 4.

The tool of FIG. 5 is similar to that of FIG. 4 except that the cage 29 and balls 307 are replaced with a one-piece work contacting device 30 in the form of a roller or sphere which abuts against the two platforms 406 and is movable into linear or point contact with the flat surfaces 27, 28 flanking the inside corner or edge 24 of a workpiece W4. The device 30 is connected to a shaft 32 by a torsion spring 31, and the shaft 32 is secured to a plate-like holder 33 which, in turn, is secured to the frame of the gauging tool. The surfaces 27 and 28 of the workpiece W4 make an angle of 90°; therefore, the axes 403 of the two sensors 405 are disposed at right angles to each other. If the device 30 contacts the surface 27 ahead of the surface 28, it is caused to move relative to the surface 27 and the right-hand platform 406 until it strikes against and is arrested by the surface 28, i.e., the vertical sensor 405 continues to move after the horizontal sensor 405 comes to a halt. Those portions of the work contacting device which engage the surfaces 27 and 28 constitute integral parts of the roller or sphere 30.

The tool of FIG. 4 or 5 is utilized when the corner is an inside corner and the one and/or the other surface flanking the corner is relatively short so that there might not be enough room for the utilization of a composite work contacting device with a cage and two balls or rollers. Furthermore, the structures which are shown in FIGS. 4 and 5 contribute to simplicity of the tool because they employ simple one-piece work contacting devices. The tool of FIG. 5 is especially simple since it dispenses with the rod and fulcrum for the rod; in fact, even the substantially V-shaped or L-shaped yoke can be omitted and the corresponding cylinders 304 or 404 connected directly to frame F3 (FIG. 4) or holder 33 (FIG. 5). The torsion spring 31 of FIG. 5 can be replaced by other suitable means for connecting the device 30 with the holder 33 and for simultaneously biasing the work contacting ball or roller 30 against both platforms 406 while permitting such ball or roller to move transversely of the path of movement of the vertical or horizontal sensor 405.

Figure 6:
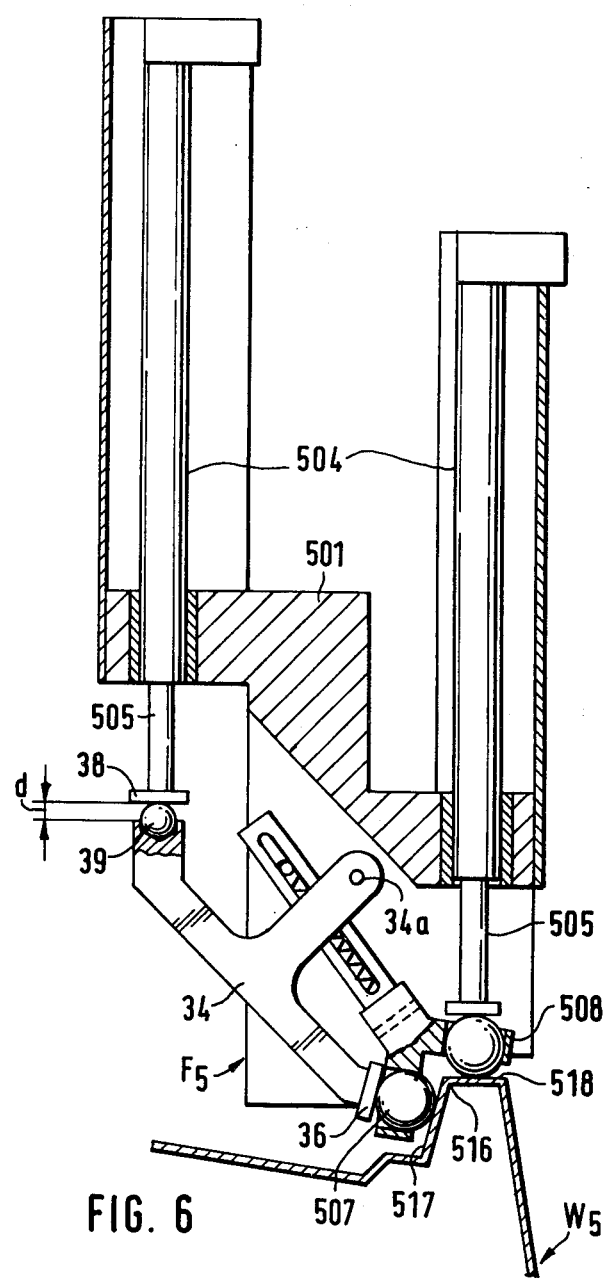
FIG. 6 is a fragmentary partly sectional plan view of a further tool wherein the axes of the two sensors are parallel to each other in order to afford access to a corner between two surfaces making obtuse angle.

FIG. 6 shows a modified tool wherein the two piston rods 505 are parallel to each other. Such design of the tool is necessary or advisable when the location of the corner or edge 516 to be gauged is such that it is not accessible to tools of the type shown in FIGS. 1 to 5.

The tool of FIG. 6 is designed to ascertain the location of the corner 516 between two external surfaces 517, 518 of a workpiece W5. The surfaces 517, 518 make an obtuse angle and the left-hand portion of the workpiece W5 provides no room for proper positioning of a horizontal piston rod 505 (as viewed in FIG. 6). The operative connection between the left-hand ball 507 which is to engage the surface 517 and the left-hand piston rod 505 comprises a substantially T-shaped two-armed lever 34 one arm of which carries a first disc 36 constituting an equivalent of the left-hand platform 6 shown in FIG. 1 and the other arm of which carries an additional ball 39 cooperating with a disc or flange 38 at the lower end of the left-hand piston rod 505. The manner in which the receptacle or cage 508 for the two balls 507 is mounted on the frame F5 is the same as described in connection with FIG. 1. The configuration of the yoke 501 is somewhat different in view of parallel mounting of the cylinders 504 for the piston rods 505.

If the right-hand piston rod 505 of FIG. 6 is arrested ahead of the left-hand piston rod 505 because the right-hand ball 507 strikes against the surface 518 before the left-hand ball 507 reaches the surface 517, the lever 34 continues to pivot at 34a as a result of downward movement of the left-hand piston rod 505, and the electronic monitoring system ascertains the extent of such movement of the left-hand piston rod after stoppage of the right-hand rod.

The right-hand piston rod 505 of FIG. 6 constitutes a one-piece sensor. The other sensor includes two discrete sections which are movable relative to each other, namely, the left-hand piston rod 505 and the lever 34. The straight path of movement of the section or piston rod 505 of the left-hand sensor is at least substantially parallel to the straight path of movement of the right-hand sensor or piston rod 505.

In the embodiment of FIG. 7, the configuration of the workpiece W6 is again such that its surfaces 617, 618 could not be reached by balls which are pushed by two mutually inclined piston rods. Therefore, the piston rods 605 are parallel to each other (i.e., the axes of their cylinders 604 are vertical, as viewed in FIG. 7). The lower end portion of the left-hand piston rod 605 carries a platform 606 but the other piston rod 605 carries a substantially frustoconical or hemispherical tip 41 which engages a disc-shaped anvil 40 on the corresponding arm of a two-armed lever 35. This lever is pivotable on a shaft 35a secured to the frame F6 for the yoke 601. The other arm of the lever 35 carries a platform 37 which contacts a roller-shaped or spherical work engaging device 630 corresponding to the device 30 of FIG. 5. The shaft 632 is mounted in the frame F6 and is connected with the component 630 by a torsion spring (not shown) so that the device 630 can be shifted relative to the frame F6 by the platform 606 or by the platform 37, depending upon whether the pivotal movement of the lever 35 is terminated before the left-hand piston rod 605 completes its downward stroke or vice versa. The reference character 616 denotes the corner or edge between the surfaces 617, 618 of the workpiece W6. The cylinders 604 are secured to a yoke 601.

The left-hand piston rod 605 of FIG. 7 is a one-piece sensor. The other sensor comprises two sections (namely, the right-hand piston rod 605 and the lever 35) which are movable with reference to each other.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims. The means for monitoring the positions of the sensors with reference to their cylinders can be of the type disclosed in the accompanying folder "SANGAMO Schlumberger Gauging Transducers" of SANGAMO TRANSDUCERS, NORTH BERSTED, BOGNOR REGIS W. SUSSEX, PO 22 9BS, ENGLAND. The disclosure of this folder is incorporated herein by reference.

We claim:

1. A tool for use in a system for automatically ascertaining the location of a corner between mutually inclined first and second surfaces of a workpiece, especially a rounded corner of a workpiece which is made of sheet metal, comprising: first and second sensors; means for supporting said sensors in such orientation that each sensor is movable toward the respective surface of the workpiece; means for moving said sensors with reference to said supporting means toward the respective surfaces along first and second paths; and work contacting means interposed between said sensors and said surfaces, said work contacting means comprising first and second portions movable by the respective sensors toward the corresponding surfaces of the workpiece and adapted to yieldably abut against said workpiece, at least said first portion being movable substantially transversely of the path of movement of the first sensor when said first portion already engages the first surface of the workpiece while the second portion continues to advance toward the second surface of the workpiece.

2. The tool of claim 1, further comprising means for moving said first portion substantially transversely of the first path in response to movement of said second sensor after said first sensor is already arrested by the workpiece.

3. The tool of claim 2, wherein said means for moving said first portion substantially transversely of said first path is the means for moving said second sensor.

4. The tool of claim 1, wherein said paths are at least substantially normal to the planes of the respective surfaces of the workpiece.

5. The tool of claim 1 for ascertaining the location of an elongated corner extending in a predetermined direction, wherein said work contacting means is movable as a unit in a plane which is substantially normal to said predetermined direction, each of said portions of said work contacting means being movable substantially transversely of the respective path and said means for moving said sensors being arranged to move one of said portions substantially transversely of the respective path when the other portion of said work contacting means is still out of contact with the respective surface while the sensor which is associated with said other portion continues to move along its path and vice versa.

6. The tool of claim 1, wherein said first sensor includes means for guiding said first portion of said work contacting means during movement of said first portion substantially transversely of the path of movement of said first sensor.

7. The tool of claim 6, wherein said guiding means comprises a platform.

8. The tool of claim 7, wherein said platform has a surface which is substantially normal to the path of movement of said first sensor and said first portion of said work contacting means includes a rotary element.

9. The tool of claim 8, wherein said rotary element has an at least partially spherical outline.

10. The tool of claim 8, wherein said rotary element is a roller.

11. The tool of claim 1, wherein each of said portions of said work contacting means is movable substantially transversely of the respective path and said work contacting means further comprises a receptacle for said portions, and further comprising means for movably mounting said receptacle on said supporting means including a lever pivotable with reference to said supporting means about an axis substantially normal to and adjacent or intersecting the line which bisects the angle between the planes of said surfaces when said sensors are supported in said orientation.

12. The tool of claim 11, wherein said receptacle is a cage and said portions of said work contacting means are rotary elements installed in said cage.

13. The tool of claim 1, wherein each of said portions is movable substantially transversely of the respective path and further comprising means for biasing said work contacting means against said first and second sensors.

14. The tool of claim 1, wherein at least one of said sensors is reciprocable along an elongated straight path.

15. The tool of claim 1, wherein said work contacting means comprises or constitutes a one-piece body having first and second surfaces which constitute the respective portions of said work contacting means and are movable into contact with the respective surfaces of the workpiece.

16. The tool of claim 15 for ascertaining the location of an inside corner, wherein said first and second surfaces of said one-piece body are at least substantially complementary to the corresponding surfaces flanking the inside corner of the workpiece.

17. The tool of claim 15, wherein said one-piece body is a rotary element and further comprising means for movably connecting said rotary element with said supporting means.

18. The tool of claim 17, wherein said connecting means comprises a torsion spring.

19. The tool of claim 17, wherein said rotary element is a sphere.

20. The tool of claim 17, wherein said rotary element is a roller.

21. The tool of claim 1, wherein at least one of said sensors comprises a plurality of sections movable relative to each other.

22. The tool of claim 21, wherein one of said sections is a pivotable lever.

23. The tool of claim 21, wherein one of said sections is reciprocable along a straight path and the other of said sensors is reciprocable along a straight path which is at least substantially parallel to said first mentioned straight path.

* * * * *